April 12, 1927.　　　　　　　　　　　　　　　　　　1,624,678
M. SCHNAIER
APPARATUS FOR FREEZING AND MOLDING CONFECTIONS
Filed Jan. 31, 1924　　　　3 Sheets-Sheet 1

INVENTOR,
Milton Schnaier
BY
Conrad A. Dieterich
his ATTORNEY

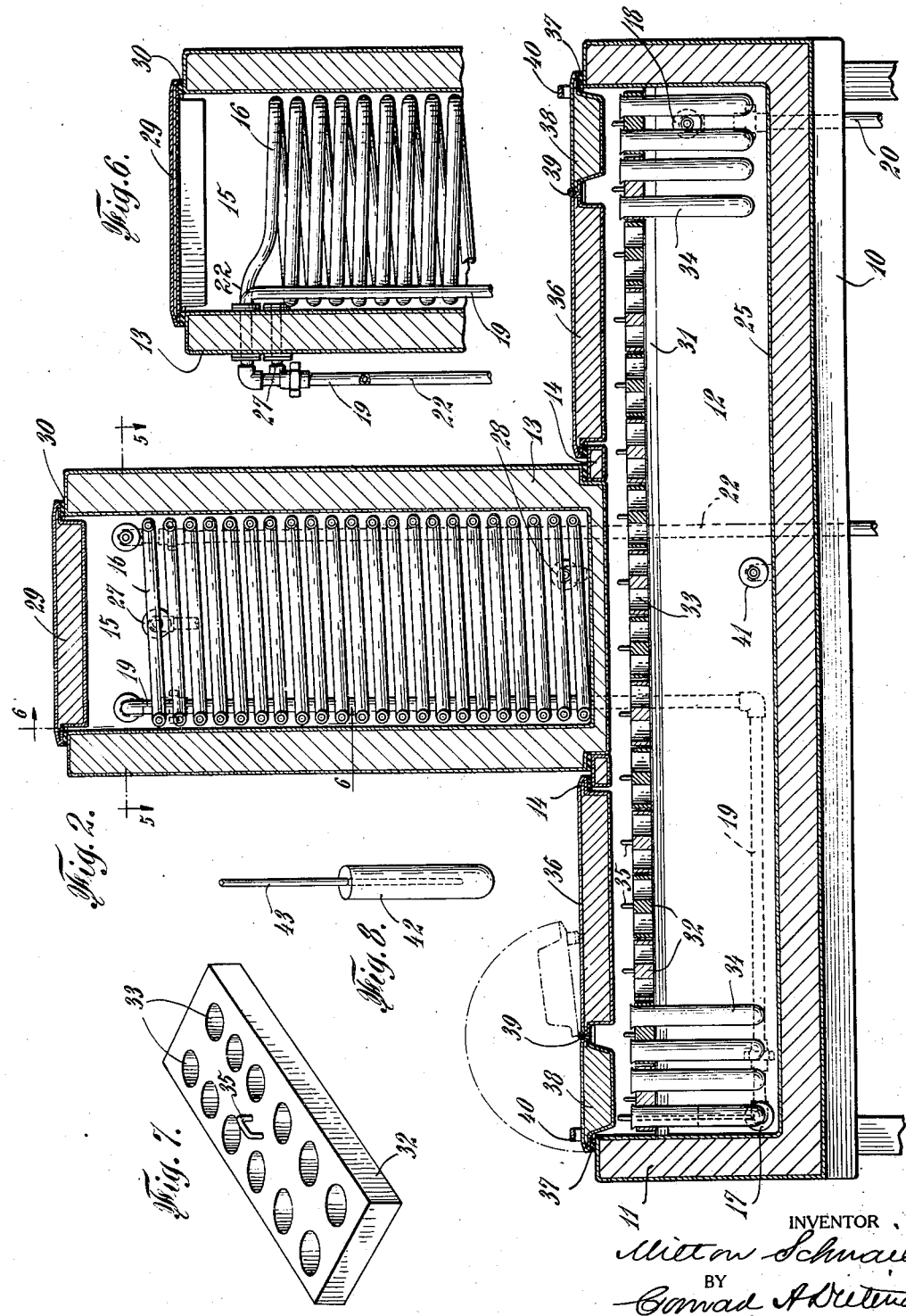

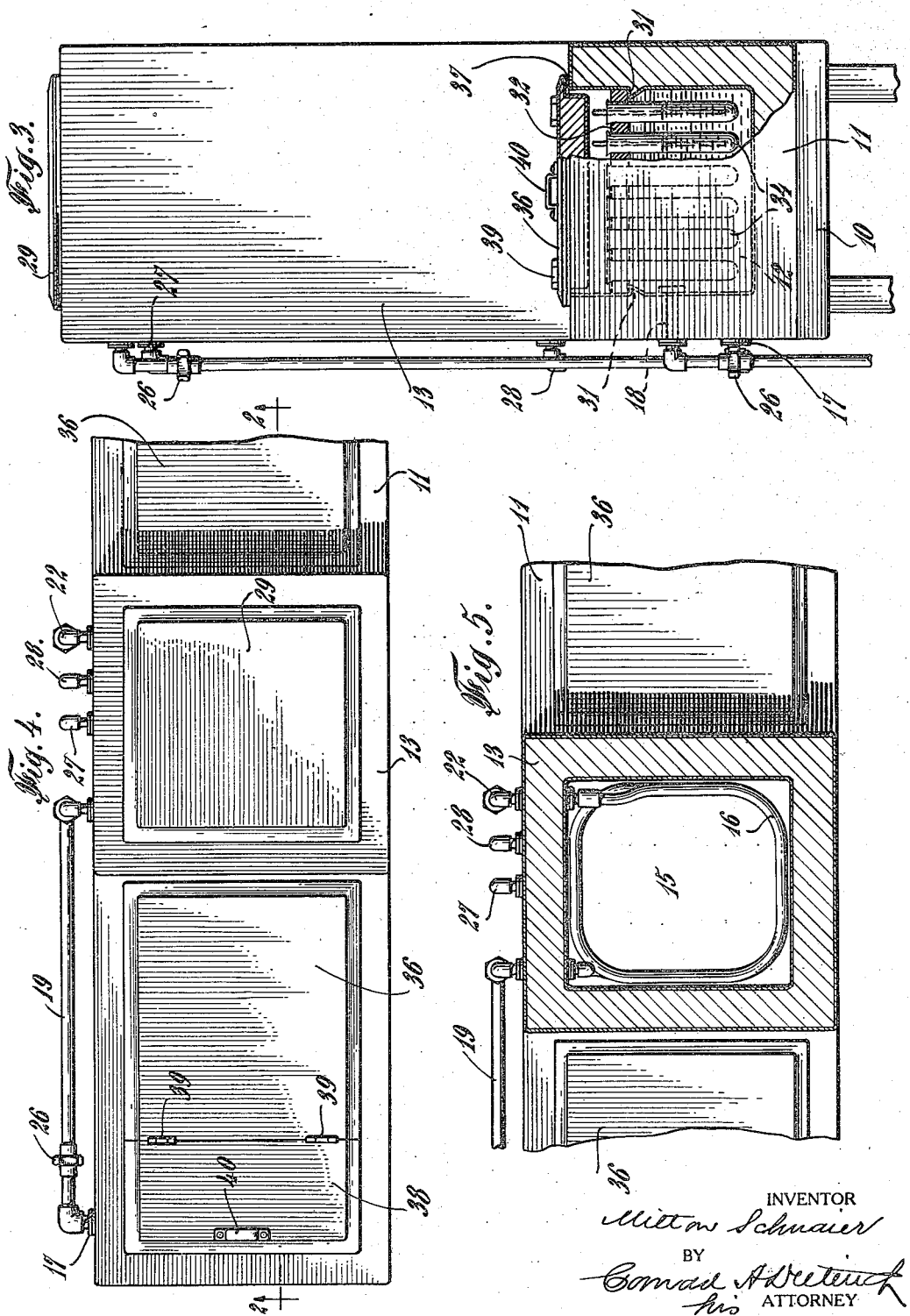

Patented Apr. 12, 1927.

1,624,678

UNITED STATES PATENT OFFICE.

MILTON SCHNAIER, OF NEW YORK, N. Y.

APPARATUS FOR FREEZING AND MOLDING CONFECTIONS.

Application filed January 31, 1924. Serial No. 689,746.

My invention relates to improvements in apparatus for freezing and molding confections, and the same has for its object more particularly to provide a simple, efficient and reliable apparatus which is compact and light, and which is readily operated to form or mold dainties or confections, such as ices and ice creams, in individual portions convenient to hold in the hand for eating.

Further, said invention has for its object to provide an apparatus in which a confection of the character specified is continuously formed or molded in relatively large quantities under sanitary and clean conditions.

Further, said invention has for its object to provide an apparatus in which the freezing agent employed therein is continuously circulated through refrigerating means to keep said freezing agent at the required temperature.

Further, said invention has for its object to provide an apparatus in which the molds for the confection to be formed or molded are so supported within the freezing receptacle as to prevent the freezing agent or liquid in said receptacle from entering said molds and mixing with the confection to spoil the same.

Further, said invention has for its object to provide an apparatus in which the temperature varying or refrigerating means thereof is disposed exteriorly of the receptacle for treating the confection to permit travel of the confection within the receptacle from end to end thereof, thus insuring complete treatment of the confection and speeding up production, and in which means is provided at opposite ends of the receptacle for the reception and discharge of said confection.

Further, said invention has for its object to provide an apparatus in which the confection to be formed or molded and the molds or containers therefor are supported in frames which, when disposed edge to edge within the receptacle therefor, form a sectional partition preventing access of the liquid bath within the receptacle to the confection over the tops of said molds or containers.

Further, said invention has for its object to provide an apparatus in which the confection is formed as individual portions in molds or containers supported in frames, in which the several frames are successively received into a freezing receptacle at one end thereof and successively discharged from the opposite end thereof to permit the contents of the molds to be properly frozen during the travel thereof from end to end of the receptacle and to speed up production, and in which the contents of the several molds during the freezing operation are protected by said frames against access of the freezing liquid thereto.

Other objects will in part be obvious and in part be pointed out hereinafter.

To the attainment of the aforesaid objects and ends my invention consists in the novel details of construction, and in the combination, connection and arrangement of parts hereinafter more fully described and then pointed out in the claims.

In the accompanying drawings showing an illustrative embodiment of the invention, Figure 1 is a front elevation showing one form of apparatus constructed according to and embodying my said invention;

Fig. 2 is an enlarged longitudinal sectional view thereof on the line 2—2 of Fig. 4;

Fig. 3 is an end elevation thereof, with parts broken away and with parts in section;

Fig. 4 is a plan view thereof with one end broken away;

Fig. 5 is a detail sectional plan view of the refrigerating receptacle on the line 5—5 of Fig. 2;

Fig. 6 is a detail sectional view of the upper part of the refrigerating receptacle on the line 6—6 of Fig. 2;

Fig. 7 is a perspective view of a mold frame; and

Fig. 8 is a perspective view of the product which is formed by means of the apparatus embodying my said invention.

Figure 1:
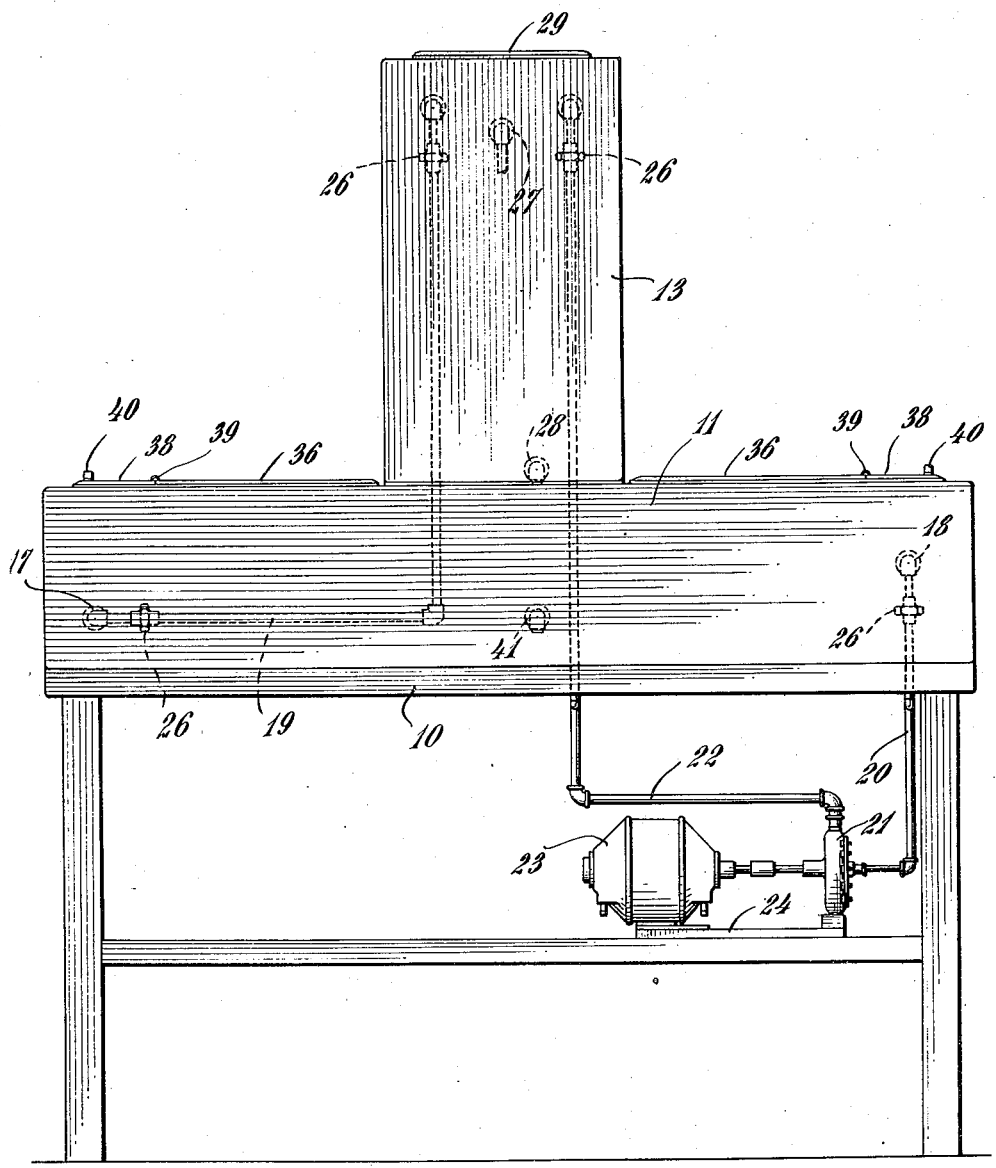

In said drawings is illustrated a supporting frame or table 10 on which rests a receptacle or tank 11 having a substantially unobstructed interior space 12 and adapted to receive or contain a freezing agent or fluid, such, for instance, as a mixture of water and alcohol, preferably in equal parts. The receptacle 11 is preferably rectangular in cross section, i. e. relatively long and narrow.

A refrigerating receptacle or tank 13 is supported above the tank 11 on the members 14 arranged transversely of the tank 11 and intermediate the ends thereof. Receptacle 13 has a chamber 15 therein in which is disposed a container, illustrated as a coil 16, for refrigerating the freezing agent. The coil 16 is communicatively connected at the opposite ends thereof with the tank 11.

For this purpose the tank 11 has an inlet 17 therein at one end near the bottom thereof and an outlet 18 therein at the opposite end near the top thereof. The inlet 17 is connected with the lower end of the coil 16 by means of the pipe or conduit 19 arranged exteriorly of the receptacles 11 and 13, and passing through the upper end of the receptacle 13 and downwardly in the chamber 15. The outlet 18 is connected with the upper end of the coil 16 through a pipe or conduit 20, pump 21, (Fig. 1), and pipe or conduit 22 passing through the upper end of receptacle 13. The pump 21 and motor 23 (Fig. 1) for driving the same are mounted on a support 24 secured below the table 10. The pipes 19, 20 and 22 are arranged exteriorly of the tank 11.

The space or chamber 15 is adapted to receive a suitable refrigerating agent, such for instance, as a mixture of ice and calcium chloride in close contact with the coil 16 to maintain the same cold.

The receptacles 11 and 13 are preferably constructed of a light material having heat insulating properties, such as balsa wood. The inner and outer surfaces of the receptacles 11 and 13 are covered with metal sheeting 25, preferably copper.

The receptacles 11 and 13 are preferably separate from each other to permit of the individual handling thereof when moved or transported, the several pipes 19, 20 and 22 being provided with box unions 26 to permit of the ready and convenient connection and disconnection thereof in the assembly and disassembly of the parts of the apparatus.

The receptacle 13 has an overflow outlet 27 at the upper portion thereof and a normally closed draining outlet 28 at the lower portion thereof. The refrigerating mixture is placed therein through an opening at the top which is normally closed by a cover 29, a suitable gasket 30 being interposed between the cover 29 and top of the receptacle 13.

Longitudinally extending supporting and guiding means, illustrated as ledges 31, project inwardly from the upper portion of the inner surfaces of the opposite longitudinal walls of the receptacle 11. These ledges 31 serve as supports for the several mold receiving members or frames 32, one of which is illustrated in Fig. 7.

Each of the frames 32 is rectangular in shape and is provided with a plurality of holes or openings 33 therein to receive and retain the molds or containers 34 in which the confection is formed or frozen. Ordinary test tubes may be employed as such molds. Each frame or rack 32 is provided with a finger piece 35 to permit of the convenient handling of the frame in inserting and removing the same into and from the receptacle 11.

The top of the receptacle 11 is normally closed by covers 36 resting on the upper edges thereof at opposite sides of receptacle 13, a suitable gasket 37 being interposed between each cover 36 and receptacle 11. The outer portions 38 of the cover 36 are hinged to the inner portions thereof at 39 to permit said portions 38 to be opened by means of finger pieces 40, as illustrated in broken lines in Fig. 2, for the reception and discharge of the frames or racks 32 into and from said receptacle 11. The receptacle 11 has a normally closed drain pipe 41 therein near the bottom.

The operation of the apparatus is substantially as follows: When the motor 23 is started the pump 21 draws the freezing agent or liquid from the receptacle 11 through outlet 18 and forces the same through the coil 16 and back to the receptacle 11 through the inlet 17. The temperature of the freezing mixture is thus maintained sufficiently low to freeze the confection. The colder liquid enters the receptacle 11 through the lower inlet 17 and the warmer liquid is removed therefrom at the opposite end through the upper outlet 18 and cooled by its passage downwardly through the coil 16, which is in contact with the refrigerating agent. By the above described arrangement and operation, in which the freezing liquid is in continuous circulation to maintain the same at the desired temperature, the interior space 12 of the receptacle 11 is rendered substantially unobstructed to permit of the insertion of members 32 into the receptacle 11 at one end and the removal thereof at the opposite end of the receptacle.

To freeze the confection, mixtures thereof are placed in the several molds 34 which are held in position on the frames 32 in the holes 33 therein. The several frames 32 with the partially filled molds 34 therein are then inserted successively through the opening at one end of the receptacle 11, the ends of the members 32 resting on the ledges 31. As each frame 32 is inserted at one end, the previously inserted frames are pushed or moved along guides 31 towards the opposite end of the receptacle until, if so desired, the several frames form a substantially continuous sectional partition, as illustrated in Fig. 2, from end to end of the receptacle 11. The normal level of the freezing liquid within the receptacle 11 should be substantially on a level with, or slightly below, ledges 31. The member 32 (or partition formed thereby) serves, therefore, to prevent the access of the freezing liquid into the upper ends of the several molds 34 and the mixing thereof with the contents of the mold to spoil the same. The movement of the several frames 32 from one end of the receptacle 11 to the opposite end thereof should be so timed as to insure the desired freezing of the confection by the time each member 32 reaches the end where it is to be removed. The members 32 are then successively discharged from the opposite end of the receptacle 11 and the frozen contents of the molds 34 removed. The molds are then refilled and the members 32 holding the same reinserted in receptacle 11 at the starting end thereof.

The product formed or molded is illustrated in Fig. 8, and consists of a frozen mass 42 of the confection in which is embedded a stick 43 for holding the same. The stick 43 is positioned in the mold with its lower end in the liquid to be frozen, as shown in Fig. 2, at the beginning of the operation.

The above described apparatus is characterized by efficiency and economy of operation, the same being thoroughly insulated. The construction or arrangement of the apparatus permits of the convenient insertion of the confection into the freezing receptacle and its removal therefrom, insuring large production thereof, if required. The operation of forming or molding the confection is substantially continuous and the frozen product is being continually removed at one end of the receptacle 11 as additional material is being inserted at the opposite end of the receptacle 11 to be frozen, the travel of such confection along the guides 31 being at a rate to insure the desired freezing thereof upon completion of such travel. The confection to be formed or frozen, furthermore, is kept clean during the treatment thereof and access of the freezing liquid thereto is prevented.

Furthermore, by my invention, the freezing liquid is kept at the required temperature by means arranged exteriorly of the freezing receptacle 11 to permit of the unobstructed travel of the members 32 from end to end of said receptacle 11.

Having thus described my said invention, what I claim and desire to secure by Letters Patent is:

1. An apparatus of the character described comprising a receptacle adapted to receive a freezing liquid, guiding and supporting means within said receptacle, a refrigerating receptacle mounted centrally upon said first named receptacle, means for circulating said liquid through said receptacles, and means at opposite sides of said first named receptacle for the reception and discharge of the substance to be treated, substantially as specified.

2. An apparatus of the character described comprising a receptacle adapted to receive a freezing liquid, a refrigerating receptacle mounted centrally above said first named receptacle and adapted to retain a refrigerating agent, a container therein, means for circulating said liquid through said first named receptacle and said container, supporting and guiding means disposed within said first named receptacle, mold receiving members adapted to be removably disposed upon and supported by said means and to be moved thereon from one end of said first named receptacle to the opposite end thereof, and means at said opposite ends of said first named receptacle for the reception and discharge of said members, substantially as specified.

3. An apparatus of the character described comprising a receptacle adapted to receive a fluid, means arranged exteriorly of said receptacle for varying the temperature of said fluid, guiding and supporting means within said receptacle, a plurality of frames supported on said means, said rectangular frames being arranged edge to edge to provide a continuous partition within said receptacle, and said frames having openings therein, confection receiving containers disposed within said openings with the upper ends thereof located above said partition, and a closure for said receptacle, substantially as specified.

4. An apparatus of the character described comprising a receptacle adapted to receive a liquid bath, means arranged exteriorly of said receptacle for varying the temperature of said liquid, supporting ledges within said receptacle above the level of the liquid therein, a plurality of rectangular mold receiving frames supported in edge to edge relation on said ledges and slidable thereon, said frames forming a continuous partition, and severally having openings therein, molds disposed in said openings, and a cover for said receptacle including means at opposite ends thereof for the reception and discharge of said frames and said molds, substantially as specified.

5. An apparatus of the character described comprising a support, a closed receptacle thereon adapted to receive a freezing liquid, an inlet in said receptacle at one end thereof, an outlet therefrom at the opposite end thereof, a refrigerating receptacle mounted on said first named receptacle and adapted to retain a refrigerating agent therein, a container therein, conduits connecting said inlet and said outlet to opposite end of said container, and arranged exteriorly of said first named receptacle, pumping means mounted on said support and interposed in said conduits for circulating said liquid to vary the temperature thereof, ledges within said first named receptacle and extending longitudinally thereof, a plurality of mold receiving frames adapted to be supported on said ledges and slidable thereon from one end of said first named receptacle to the opposite end thereof, each of said frames having therein a plurality of openings to receive and retain the molds, and means at opposite ends of said first named receptacle for the reception and discharge of said frames, substantially as specified.

Signed at the city of New York, borough of Manhattan, in the county and State of New York, this 25th day of January, one thousand nine hundred and twenty-four.

MILTON SCHNAIER.